(12) United States Patent
Thygesen

(10) Patent No.: US 7,302,725 B2
(45) Date of Patent: Dec. 4, 2007

(54) RAIL ASSEMBLY FOR A TELESCOPING RAMP

(75) Inventor: Mark Thygesen, Edmonton (CA)

(73) Assignee: Marathon Marine Manufacturing (1996) Ltd., Edmonton (CA)

( * ) Notice: Subject to any disclaimer, the term of this patent is extended or adjusted under 35 U.S.C. 154(b) by 0 days.

(21) Appl. No.: 11/302,183

(22) Filed: Dec. 12, 2005

(65) Prior Publication Data

US 2006/0288501 A1 Dec. 28, 2006

(30) Foreign Application Priority Data

Jun. 27, 2005 (CA) .................................. 2510936

(51) Int. Cl.
*E01D 1/00* (2006.01)

(52) U.S. Cl. ...................................... 14/69.5

(58) Field of Classification Search ............. 14/69.5; 119/849; D34/32
See application file for complete search history.

(56) References Cited

U.S. PATENT DOCUMENTS

| | | | | |
|---|---|---|---|---|
| 3,517,791 A | * | 6/1970 | Miles | 193/41 |
| 4,088,292 A | * | 5/1978 | Emminger | 248/205.1 |
| 4,912,796 A | * | 4/1990 | Crump | 14/69.5 |
| 4,923,360 A | * | 5/1990 | Beauchemin | 414/537 |
| 5,137,114 A | * | 8/1992 | Yde et al. | 182/49 |
| 5,205,603 A | * | 4/1993 | Burdette, Jr. | 296/62 |
| 5,244,335 A | * | 9/1993 | Johns | 414/537 |
| 5,312,149 A | * | 5/1994 | Boone | 296/61 |
| 5,331,701 A | * | 7/1994 | Chase et al. | 14/71.1 |
| 5,536,058 A | | 7/1996 | Otis | |
| 5,803,523 A | * | 9/1998 | Clark et al. | 296/26.1 |
| 5,813,071 A | | 9/1998 | Breslin et al. | |
| 5,971,465 A | * | 10/1999 | Ives et al. | 296/61 |
| 6,345,950 B1 | | 2/2002 | Gerwitz | |
| 6,484,344 B1 | | 11/2002 | Cooper | |
| 6,983,720 B2 | * | 1/2006 | Lakela | 119/165 |

\* cited by examiner

*Primary Examiner*—Gary S. Hartmann
(74) *Attorney, Agent, or Firm*—Christensen O'Connor Johnson Kindness PLLC

(57) ABSTRACT

A rail assembly for a telescoping ramp including a slider rail that is taller than it is wide, having opposed ends, opposed faces, and opposed edges. First ramp attachment means protrude outwardly from a first of the opposed faces. There is a hollow channel rail with a first side wall that consists of spaced co-planar wall segments that form a gap making the channel rail generally C-shaped in cross-section, the channel rail has an interior surface that defines an interior channel adapted to accommodate the slider rail with at least one of the opposed edges of the slider rail serving as a bearing surface which slides along the interior surface and the first ramp attachment means protruding through the gap between the wall segments. A second ramp attachment means protrudes outwardly from one of the wall segments.

27 Claims, 4 Drawing Sheets

RAIL ASSEMBLY FOR A TELESCOPING RAMP

FIELD OF THE INVENTION

The present invention relates to rail system for a telescoping ramp and a telescoping ramp that is constructed using such a rail assembly. The telescoping ramp is of the type used to load and unload a cargo area of a truck.

BACKGROUND OF THE INVENTION

Telescoping ramps are known in the art. There are a number of existing configurations of telescoping ramp, including the following U.S. Pat. Nos.: 5,536,058 (Otis 1996); U.S. Pat. No. 5,813,071 (Breslin et al 1998); U.S. Pat No. 6,345,950 (Gerwitz 2002); and U.S. Pat. No. 6,484,344 (Cooper 2002).

SUMMARY OF THE INVENTION

According to the present invention there is provided a rail assembly for a telescoping ramp, which includes a slider rail and a hollow channel rail. The slider rail is taller than it is wide, with opposed ends, opposed faces, and opposed edges. First ramp attachment means protrude outwardly from a first of the opposed faces. The hollow channel rail has a first side wall consisting of spaced co-planar wall segments forming a gap making the channel rail generally C-shaped in cross-section. The channel rail has an interior surface that defines an interior channel adapted to accommodate the slider rail with at least one of the opposed edges of the slider rail serving as a bearing surface which slides along the interior surface and the first ramp attachment means protruding through the gap between the wall segments. Second ramp attachment means protrude outwardly from one of the wall segments.

BRIEF DESCRIPTION OF THE DRAWINGS

These and other features of the invention will become more apparent from the following description in which reference is made to the appended drawings, the drawings are for the purpose of illustration only and are not intended to in any way limit the scope of the invention to the particular embodiment or embodiments shown, wherein.

DETAILED DESCRIPTION OF THE PREFERRED EMBODIMENT

Figure 1:
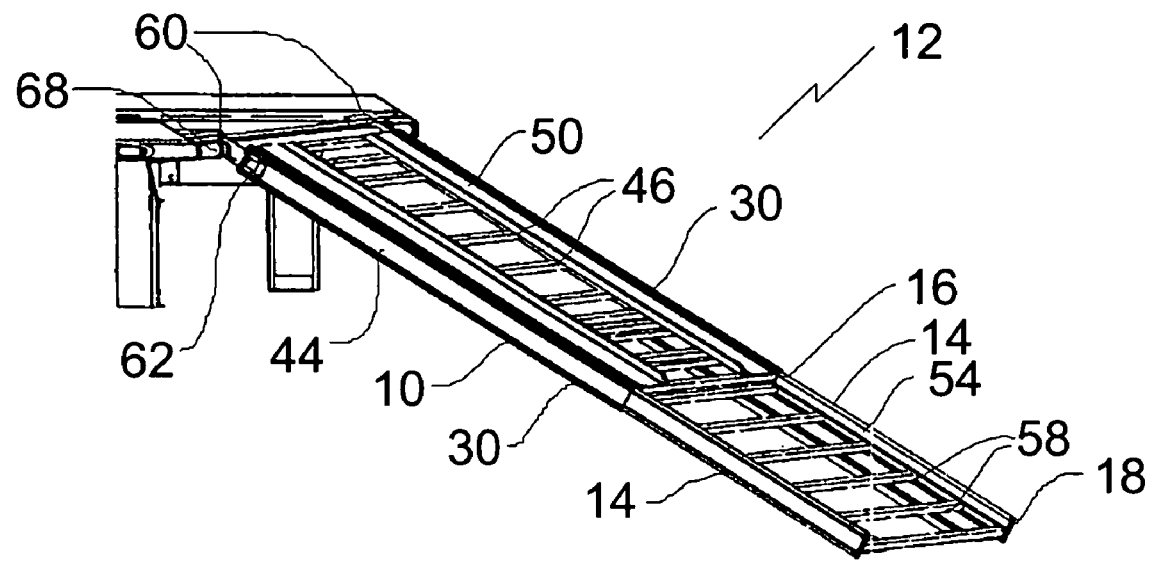
FIG. 1 is a perspective view of a telescoping ramp constructed in accordance with the teachings of the present invention, in an extended position.

The preferred embodiment, a rail assembly for a telescoping ramp generally identified by reference numeral 10, will now be described with reference to FIG. 1 through 8.

Rail Structure:

Referring now to FIG. 1, rail assembly 10 for a telescoping ramp 12 includes a slider rail 14 and a channel rail 30. Slider rail 14 is taller than it is wide, has opposed ends 16 and 18, and, referring to FIG. 3, opposed faces 20 and 22, and opposed edges 24 and 26. A first ramp attachment means, such as a pair of parallel spaced flanges 28, extend for substantially the entire length of slider rail 14 between opposed ends 16 and 18 and protrude outwardly from opposed face 20. Channel rail 30 is generally parallel-piped and hollow with a first side wall 32 consisting of spaced co-planar wall segments 34 that form a gap to make channel rail 30 generally C-shaped in cross-section. Channel rail 30 has an interior surface 36 that defines an interior channel 38 adapted to accommodate slider rail 14 with either opposed edges 24 or 26 of slider rail 14 serving as a bearing surface 25 that slides along interior surface 36, and flanges 28 protruding through the gap between wall segments 34. Alternatively, opposed edges 24 and 26 may incorporate wheels or other means to act as a bearing surface. Both slider rail 14 and channel rail 30 are preferably aluminium extrusions. It is preferred that "gutters" 37 be positioned along the edges of interior surface 36 of channel rail 30, to provide a space for debris to go. A second ramp attachment means, such as parallel spaced flanges 40 that extend for substantially the entire length of channel rail 30 protrude outwardly from one of the wall segments 34. For improved strength and performance, structural ribs 42 may be included that protrude from face 22 of slider rail 14 and extend between opposed ends 16 and 18. There may also be structural ribs 44 protruding from a second side wall 45 of channel rail 30. Structural ribs 42 and 44 may be used for a variety of functions. They may form a channel for attachment hook 60, act as a splice reinforcement, a roller channel, a spacer, or be used to stiffen slider rail 14.

Figure 3:
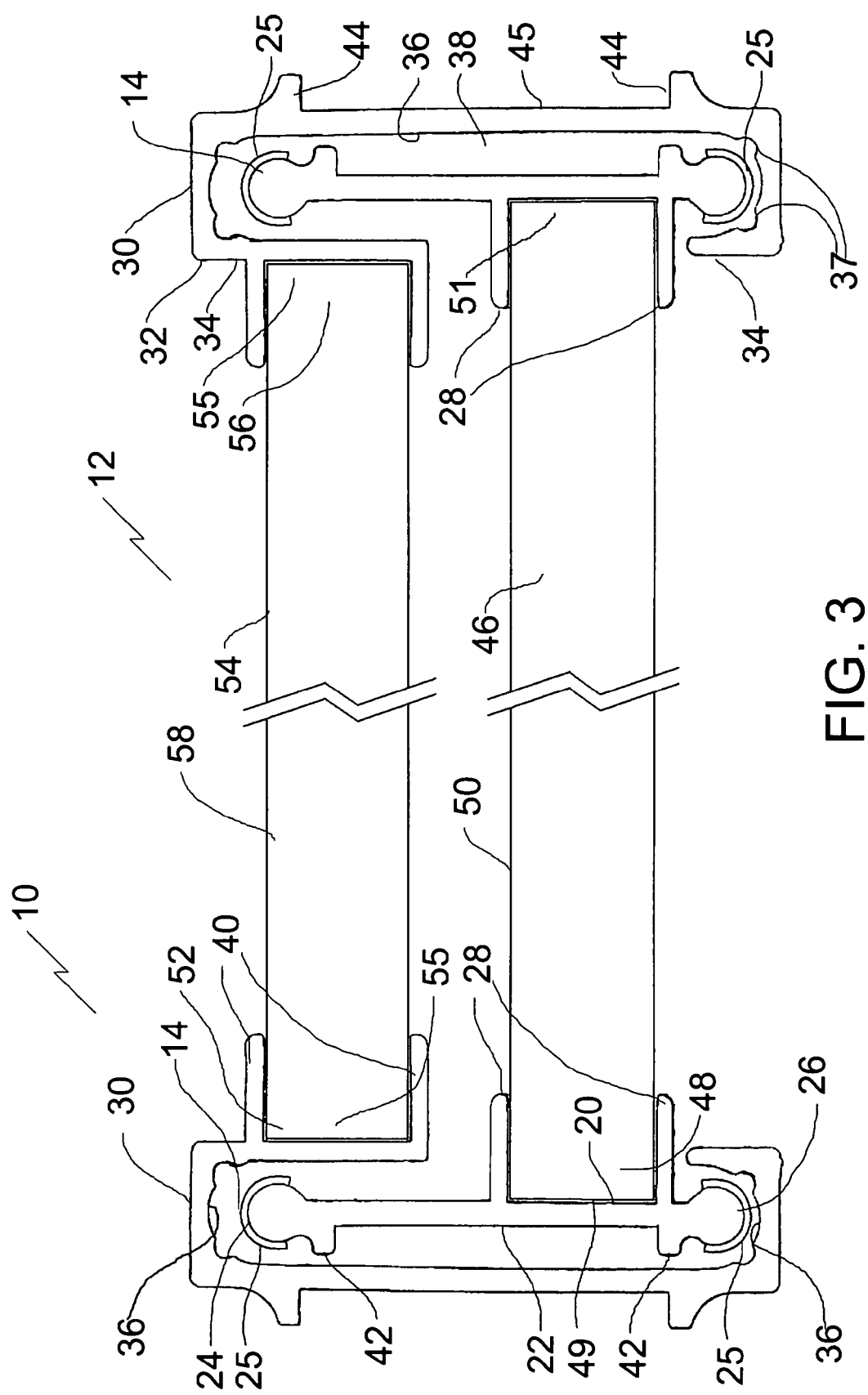
FIG. 3 is an end elevation view, in section, of the telescoping ramp illustrated in FIG. 1.

Telescoping Ramp Structure:

Referring now to FIG. 3, telescoping ramp 12 includes two slider rails 14 and two channel rails 30 as described above. Slider rails 14 include first ramp attachment means, such as parallel spaced flanges 28. Referring to FIG. 1, a plurality of cross-member members 46 extend between two slider rails 14 in parallel spaced relation to form a first ramp section 50. It will be appreciated that cross-member members 46 can serve as support for some form of covering substrate or could be replaced by a solid sheet. It is preferred to use cross-member members 46 and cover portions with a covering substrate, as it is less expensive. Referring again to FIG. 3, cross-member members 46 are secured in a channel 48 defined by parallel spaced flanges 28. Slider rails 14 are positioned in parallel spaced relation with a first opposed edge 49 of the first ramp section 50 secured to parallel spaced flanges 28 of one of the two slider rails 14 and a second opposed edge 51 of first ramp section 50 secured to parallel spaced flanges 28 of the other slider rail 14.

Referring to FIG. 1, a plurality of cross-member members 58 extend between two channel rails 14 in parallel spaced relation to form a second ramp section 50. Referring to FIG. 3, the two channel rails 30 are positioned in parallel spaced relation with a first opposed edge 52 of the second ramp section 54 secured to in a channel 55 defined by parallel spaced flanges 40 (second ramp attachment means) of one of the two channel rails 30 and a second opposed edge 56 of second ramp section 54 secured in a channel 55 defined by parallel spaced flanges 40 of the other channel rail 30.

Figure 2:
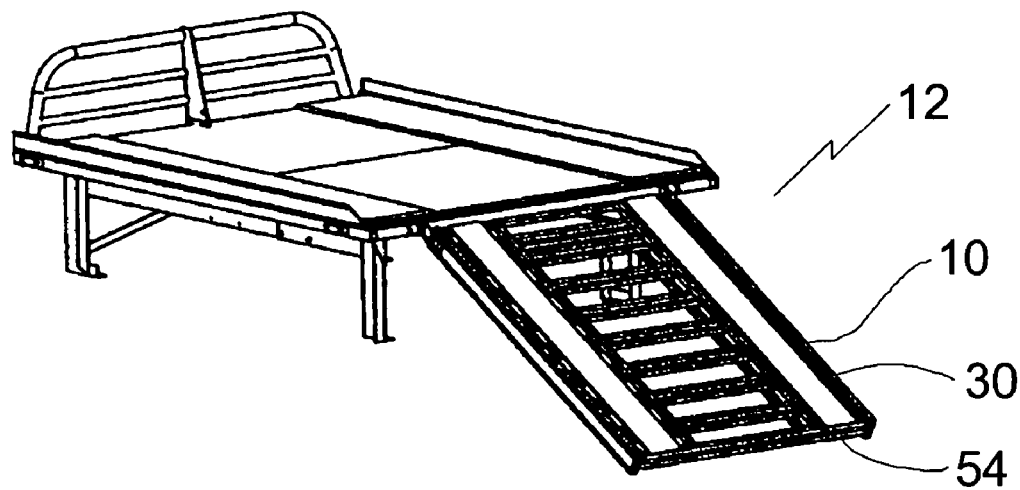
FIG. 2 is a perspective view of the telescoping ramp illustrated in FIG. 1, in a retracted position.

As will hereinafter be further described, ramp 12 is able to be extended and retracted. The extended position is shown in FIG. 1, and the retracted position is shown in FIG. 2. Referring to FIG. 3, one of opposed edges 24 or 26 of slider rail 14 serve as bearing surface 25 that slides along interior surface 36 of channel rail 30.

Figure 4:
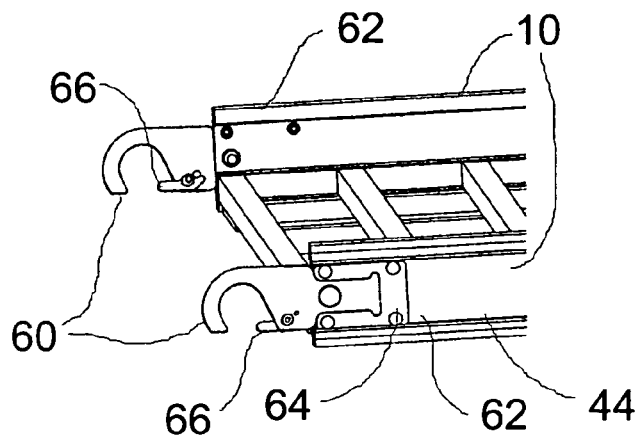
FIG. 4 is detailed perspective view of the telescoping ramp illustrated in FIG. 1, with attachment hooks in a first orientation.
Figure 5:
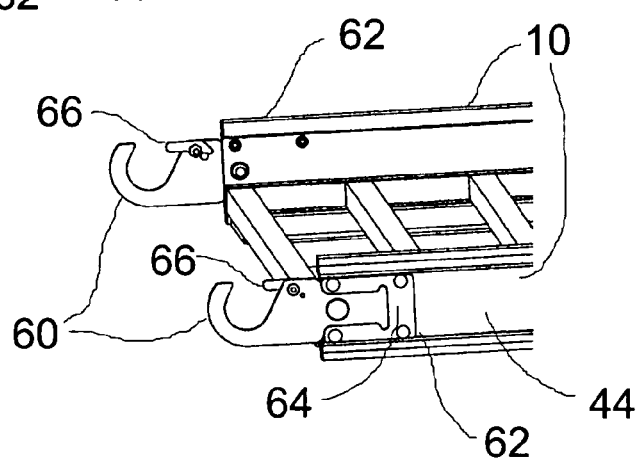
FIG. 5 is detailed perspective view of the telescoping ramp illustrated in FIG. 1, with attachment hooks in a second orientation.
Figure 6:
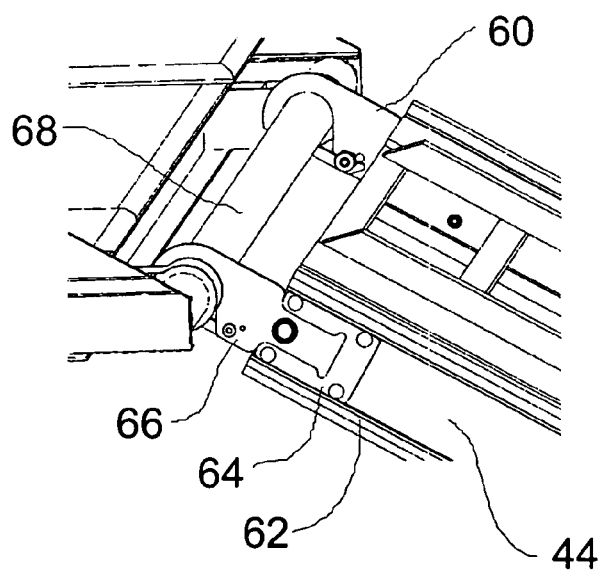
FIG. 6 is a detailed perspective view of the telescoping ramp illustrated in FIG. 1 attached to an anchor bar.
Figure 7:
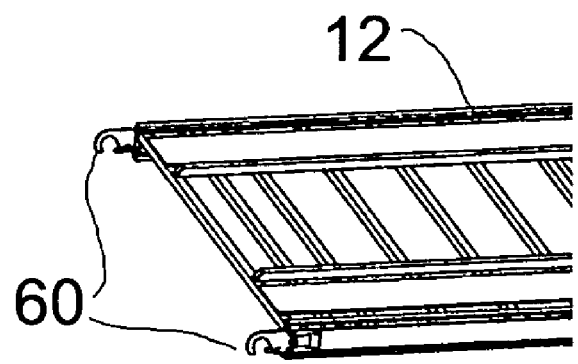
FIG. 7 is a perspective view of the telescoping ramp illustrated in FIG. 1 adapted to load snowmobiles.
Figure 8:
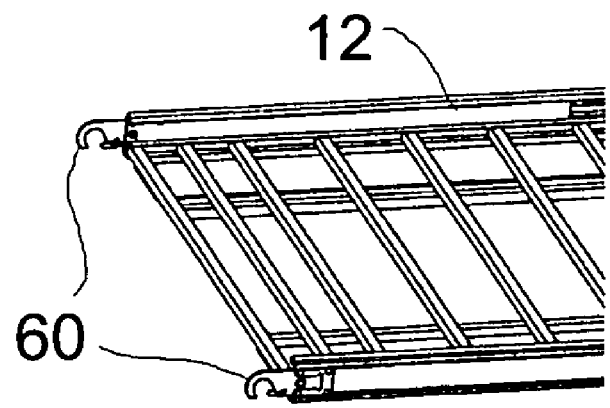
FIG. 8 is a perspective view of the telescoping ramp illustrated in FIG. 1 adapted to load ATVs.

Referring now to FIG. 4, an attachment hook 60 is mounted to a second side wall 45 at a first end 62 of each of the two channel rails 30 by means of a hook mounting receiver 64. Hook mounting receiver 64 is symmetrical and adapted to facilitate the attachment hook 60 from being secured in more than one orientation. The other orientation is shown in FIG. 5. Referring to FIG. 6, attachment hook 60 also has a safety catch 66 which pivots freely in a first direction to permit insertion of an anchor bar 68 into attachment hook 60 and resists pivotal movement in a second direction, thereby preventing accidental release of anchor bar 68. Referring to FIGS. 7 and 8, attachment hook 60 may be made reversible to permit ramp 12 to be adapted to load different types of vehicles, for example. FIG. 7 shows ramp 12 adapted to load snowmobiles, and FIG. 8 shows ramp 12 adapted to load ATVs.

Operation:

The use and operation of rail assembly 10 for a telescoping ramp 12 will now be discussed with reference to FIGS. 1 through 8. Referring to FIG. 3, slider rail 14 is positioned in channel rail 30 as discussed above, with cross-member members 46 and 58 installed between parallel spaced flanges 28 and 40, respectively, to form first ramp section 50 and second ramp section 54. Referring to FIG. 6, ramp 12 is installed by attaching attachment hook 66 on anchor bar 68. As anchor bar 68 is inserted into attachment hooks 60, safety catch 66 pivots in a first direction to permit insertion of anchor bar 68. Once anchor bar 68 is fully inserted, safety catch 66 returns to its original position and resists further movement in the second direction to prevent accidental release of anchor bar 68. Referring to FIGS. 1 and 2, ramp can then be extended or kept in the retracted position, depending on the loading or unloading requirements. Referring to FIGS. 7 and 8, ramp 12 may be removed and reversed if a different type of vehicle is being loaded. Referring to FIGS. 4 and 5, this is done by removing attachment hooks 60 from hook mounting receivers 64 and replacing them in the other orientation. To remove ramp 12 from anchor bar 68, safety catch 66 is lifted until an opening is provided in attachment hook 60 that is wide enough to allow anchor bar 68 to pass.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope of the invention as hereinafter defined in the Claims.

What is claimed is:

1. A rail assembly for a telescoping ramp, comprising:
    a slider rail that is taller than it is wide, having opposed ends, opposed faces, and opposed edges;
    first ramp attachment means protruding outwardly from a first of the opposed faces;
    a hollow channel rail with a first side wall consisting of spaced co-planar wall segments forming a gap making the channel rail generally C-shaped in cross-section, the channel rail having an interior surface that defines an interior channel adapted to accommodate the slider rail with one of the opposed edges of the slider rail serving as a bearing surface which slides along the interior surface and the first ramp attachment means protruding through the gap between the wall segments;
    the width of the slider rail being less than a width of the interior channel of the hollow channel rail such that the bearing surface of the slider rail only engages a slider rail engaging portion of the interior surface of the channel rail leaving space on either side of the slider rail for accumulation of debris in recessed gutters positioned along opposed edges of the slider rail engaging portion of the interior surface of the channel rail; and
    second ramp attachment means protruding outwardly from one of the wall segments.

2. The rail assembly as defined in claim 1, wherein the opposed faces are generally parallel.

3. The rail assembly as defined in claim 1, wherein the slider rail is aluminum.

4. The rail assembly as defined in claim 1, wherein the channel rail is aluminum.

5. The rail assembly as defined in claim 1, wherein the first ramp attachment means are a pair of parallel spaced flanges.

6. The rail assembly as defined in claim 5, wherein the parallel spaced flanges extend for substantially an entire length of the slider rail between the opposed ends.

7. The rail assembly as defined in claim 1, wherein the second ramp attachment means are a pair of parallel spaced flanges.

8. The rail assembly as defined in claim 7, wherein the parallel spaced flanges extend for substantially an entire length of the channel rail.

9. The rail assembly as defined in claim 1, wherein structural ribs protrude from a second of the opposed faces of the slider rail, the structural ribs extending between the opposed ends.

10. The rail assembly as defined in claim 1, wherein structural ribs protrude from a second side wall of the channel rail.

11. The rail assembly as defined in claim 1, wherein an attachment hook is mounted to a second side wall at a first end of the channel rail.

12. The rail assembly as defined in claim 11, wherein the attachment hook is mounted by means of a hook mounting receiver.

13. The rail assembly as defined in claim 12, wherein the hook mounting receiver is symmetrical and adapted to facilitate the attachment hook from being secured in more than one orientation.

14. The rail assembly as defined in claim 11, wherein the attachment hook has a safety catch which pivots freely in a first direction to permit insertion of an anchor bar into the attachment hook and resists pivotal movement in a second direction, thereby preventing accidental release of the anchor bar.

15. The rail assembly as defined in claim 1, wherein two slider rails are provided in parallel spaced relation with a first opposed edge of a first ramp section secured to the first ramp attachment means of a first of the two slider rails and a second opposed edge of the first ramp section secured to the first ramp attachment means of a second of the two slider rails; and two channel rails are provided in parallel spaced relation with a first opposed edge of a second ramp section secured to the second ramp attachment means of a first of the two channel rails and a second opposed edge of the second ramp section secured to the second ramp attachment means of a second of the two channel rails.

16. A rail assembly for a telescoping ramp, comprising:

a slider rail that is taller than it is wide, having opposed ends, opposed faces, and opposed edges;

first ramp attachment means protruding outwardly from a first of the opposed faces, the first ramp attachment means being a pair of parallel spaced flanges that extend for substantially an entire length of the slider rail between the opposed ends;

a hollow channel rail with a first side wall consisting of spaced co-planar wall segments forming a gap making the channel rail generally C-shaped in cross-section, the channel rail having an interior surface that defines an interior channel adapted to accommodate the slider rail with at least one of the opposed edges of the slider rail serving as a bearing surface which slides along the interior surface and the first ramp attachment means protruding though the gap between the wall segments;

the width of the slider rail being less than a width of the interior channel of the hollow channel rail such that the bearing surface of the slider rail only engages a slider rail engaging portion of the interior surface of the channel rail leaving space on either side of the slider rail for accumulation of debris in recessed gutters positioned along opposed edges of the slider rail engaging portion of the interior surface of the channel rail; and second ramp attachment means protruding outwardly from one of the wall segments, the second ramp attachment means being a pair of parallel spaced flanges that extend for substantially an entire length of the channel rail.

17. The rail assembly as defined in claim 16, wherein the slider rail and the channel rail are aluminum.

18. The rail assembly as defined in claim 16, wherein structural ribs protrude from a second of the opposed faces of the slider rail, the structural ribs extending between the opposed ends.

19. The rail assembly as defined in claim 16, wherein structural ribs protrude from a second side wall of the channel rail.

20. A telescoping ramp, comprising:

two slider rails, each slider rail being is taller than it is wide, with opposed ends, opposed faces, and opposed edges;

first ramp attachment means protruding outwardly from a first of the opposed faces;

the two slider rails being positioned in parallel spaced relation with a first opposed edge of a first ramp section secured to the first ramp attachment means of a first of the two slider rails and a second opposed edge of the first ramp section secured the first ramp attachment means of a second of the two slider rails;

two hollow channel rails, each channel rail having a first side wall consisting of spaced co-planar wall segments forming a gap making the channel rail generally C-shaped in cross-section, each channel rail having an interior surface that defines an interior channel adapted to accommodate one of the slider rails with one of the opposed edges of the slider rail serving as a bearing surface which slides along the interior surface and the first ramp attachment means protruding through the gap between the wall segments;

the width of the slider rail being less than a width of the interior channel of the hollow channel rail such that the bearing surface of the slider rail only engages a slider rail engaging portion of the interior surface of the channel rail leaving space on either side of the slider rail for accumulation of debris in recessed gutters positioned along opposed edges of the slider rail engaging portion of the interior surface of the channel rail; and second ramp attachment means protruding outwardly from one of the wall segments; and the two channel rails being positioned in parallel spaced relation with a first opposed edge of a second ramp section secured to the second ramp attachment means of a first of the two channel rails and a second opposed edge of the second ramp section secured to the second ramp attachment means of a second of the two channel rails.

21. The telescoping ramp as defined in claim 20, wherein the first ramp attachment means are a pair of parallel spaced flanges and the ramp is made from a plurality of cross-member members that extend between the two slide rails in parallel spaced relation and which are secured in a channel defined by the parallel spaced flanges.

22. The telescoping ramp as defined in claim 20, wherein the second ramp attachment means are a pair of parallel spaced flanges and the ramp is made from a plurality of cross-member members that extend between the two channel rails in parallel spaced relation and which are secured in a channel defined by the parallel spaced flanges.

23. The telescoping ramp as defined in claim 20, wherein the two slider rails and the two channel rails are aluminum extrusions.

24. The telescoping ramp as defined in claim 20, wherein an attachment hook is mounted to one of a side wall at a first end of each of the two channel rails or a side wall at one of the opposed ends of each of the two slider rails.

25. The telescoping ramp as defined in claim 24, wherein the attachment hook is mounted by means of a hook mounting receiver.

26. The telescoping ramp as defined in claim 25, wherein the hook mounting receiver is symmetrical and adapted to facilitate the attachment hook from being secured in more than one orientation.

27. The telescoping ramp as defined in claim 24, wherein the attachment hook has a safety catch which pivots freely in a first direction to permit insertion of an anchor bar into the attachment hook and resists pivotal movement in a second direction, thereby preventing accidental release of the anchor bar.

* * * * *